United States Patent
Shimizu et al.

(10) Patent No.: US 8,688,587 B2
(45) Date of Patent: Apr. 1, 2014

(54) CONTENT RECORDING APPARATUS, METHOD FOR CONTROLLING THE CONTENT RECORDING APPARATUS, AND RECORDING PROGRAM FOR THE CONTENT RECORDING APPARATUS

(75) Inventors: Miki Shimizu, Hirakata (JP); Hiromichi Shimada, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1843 days.

(21) Appl. No.: 11/249,146

(22) Filed: Oct. 13, 2005

(65) Prior Publication Data

US 2006/0089916 A1   Apr. 27, 2006

(30) Foreign Application Priority Data

Oct. 13, 2004  (JP) .................................. 2004-299292

(51) Int. Cl.
  *H04B 1/66* (2006.01)
  *H04L 29/06* (2006.01)
  *G06F 21/00* (2013.01)

(52) U.S. Cl.
  USPC .............................. 705/57; 375/240; 713/165

(58) Field of Classification Search
  USPC ....................................................... 705/1–79
  See application file for complete search history.

(56) References Cited

U.S. PATENT DOCUMENTS

| | | | |
|---|---|---|---|
| 6,697,567 B1 | 2/2004 | Suzuki | |
| 6,804,453 B1 * | 10/2004 | Sasamoto et al. | 386/94 |
| 6,968,122 B2 | 11/2005 | Kondo | |
| 7,209,647 B2 * | 4/2007 | Bruls | 386/109 |
| 7,236,526 B1 * | 6/2007 | Kitamura | 375/240.16 |
| 7,283,633 B2 * | 10/2007 | Asano et al. | 380/281 |
| 7,409,063 B2 * | 8/2008 | Shimada et al. | 380/279 |
| 7,421,742 B2 * | 9/2008 | Kitani et al. | 726/31 |
| 2002/0071658 A1 * | 6/2002 | Marko et al. | 386/70 |
| 2003/0159037 A1 * | 8/2003 | Taki et al. | 713/168 |
| 2004/0010468 A1 * | 1/2004 | Abe et al. | 705/50 |

(Continued)

FOREIGN PATENT DOCUMENTS

| | | |
|---|---|---|
| EP | 1 612 987 A1 | 1/2006 |
| JP | 2000-333169 | 11/2000 |
| JP | 2001-344898 | 12/2001 |
| JP | 2002-007074 | 1/2002 |

(Continued)

OTHER PUBLICATIONS

Japanese Office Action issued in Japanese Patent Application No. JP 2004-299292, dated Jun. 9, 2009.

*Primary Examiner* — Alexander Kalinowski
*Assistant Examiner* — Murali Dega
(74) *Attorney, Agent, or Firm* — McDermott Will & Emery LLP

(57) ABSTRACT

Disclosed is a content recording apparatus having recording devices A and B and first and second encrypting units that are provided for the respective recording devices. When receiving stream data representing content from an input unit, a rate changing unit operates so as to input streams of data in parallel to the respective encrypting units. The first encrypting unit encrypts the stream data with an encryption key generated from the IDs of the recording device A and of a recording medium a. The second encrypting unit encrypts the stream data with an encryption key generated from the IDs of the recording device B and of a recording medium b. Each of the recording devices A and B records the content encrypted by a corresponding one of the first and second encrypting units.

18 Claims, 7 Drawing Sheets

(56) References Cited

U.S. PATENT DOCUMENTS

| | | |
|---|---|---|
| 2004/0267671 A1* | 12/2004 | Nonaka et al. ............... 705/51 |
| 2005/0038997 A1* | 2/2005 | Kojima et al. .............. 713/165 |
| 2005/0063668 A1* | 3/2005 | Hosoi et al. ................ 386/52 |
| 2005/0193421 A1* | 9/2005 | Cragun ..................... 725/80 |
| 2005/0213939 A1 | 9/2005 | Suzuki |
| 2006/0089916 A1* | 4/2006 | Shimizu et al. ............. 705/57 |
| 2006/0179107 A1* | 8/2006 | Iwata et al. ................ 709/203 |

FOREIGN PATENT DOCUMENTS

| | | |
|---|---|---|
| JP | 2002-245718 | 3/2002 |
| JP | 2002-319227 | 10/2002 |
| JP | 2003-023419 | 1/2003 |
| JP | 2003-208756 | 7/2003 |
| JP | 2004-282238 | 10/2004 |
| JP | 2005-229156 | 8/2005 |

* cited by examiner

FIG.2

DEVICE INFORMATION

| RECORDING DEVICE | DEVICE ID | MAXIMUM BIT RATE | TYPE |
|---|---|---|---|
| RECORDING DEVICE A | AAAA | 11Mbps | DVD RECORDER |
| RECORDING DEVICE B | BBBB | 24Mbps | HDD |

FIG.3

MEDIUM INFORMATION

| RECORDING DEVICE | MOUNTED MEDIUM | MEDIUM ID | FREE CAPACITY |
|---|---|---|---|
| RECORDING DEVICE A | DVD-RAM | aaaa | 200MB |
| RECORDING DEVICE B | HD | bbbb | 300GB |

FIG.4A

HISTORY INFORMATION

| RECORDING DEVICE | MEDIUM ID | CONTENT INFORMATION (RECORDING DATE & TIME/CH/TITLE/BIT RATE) |
|---|---|---|
| RECORDING DEVICE A | aaaa | 20040520180/4/news2/11Mbps |
| RECORDING DEVICE B | bbbb | 200404110700/2/sportsA/8.5Mbps |
| RECORDING DEVICE B | bbbb | 20040520180/4/news2/11Mbps |

FIG.4B

HISTORY INFORMATION

| RECORDING DEVICE | MEDIUM ID | CONTENT INFORMATION (RECORDING DATE & TIME/CH/TITLE/BIT RATE) | RESTRICTION INFO |
|---|---|---|---|
| RECORDING DEVICE A | aaaa | 20040520180/4/news2/11Mbps | |
| RECORDING DEVICE B | bbbb | 200404110700/2/sportsA/8.5Mbps | |
| RECORDING DEVICE B | bbbb | 20040520180/4/news2/11Mbps | PLAYBACK/EDITING PROHIBITED |

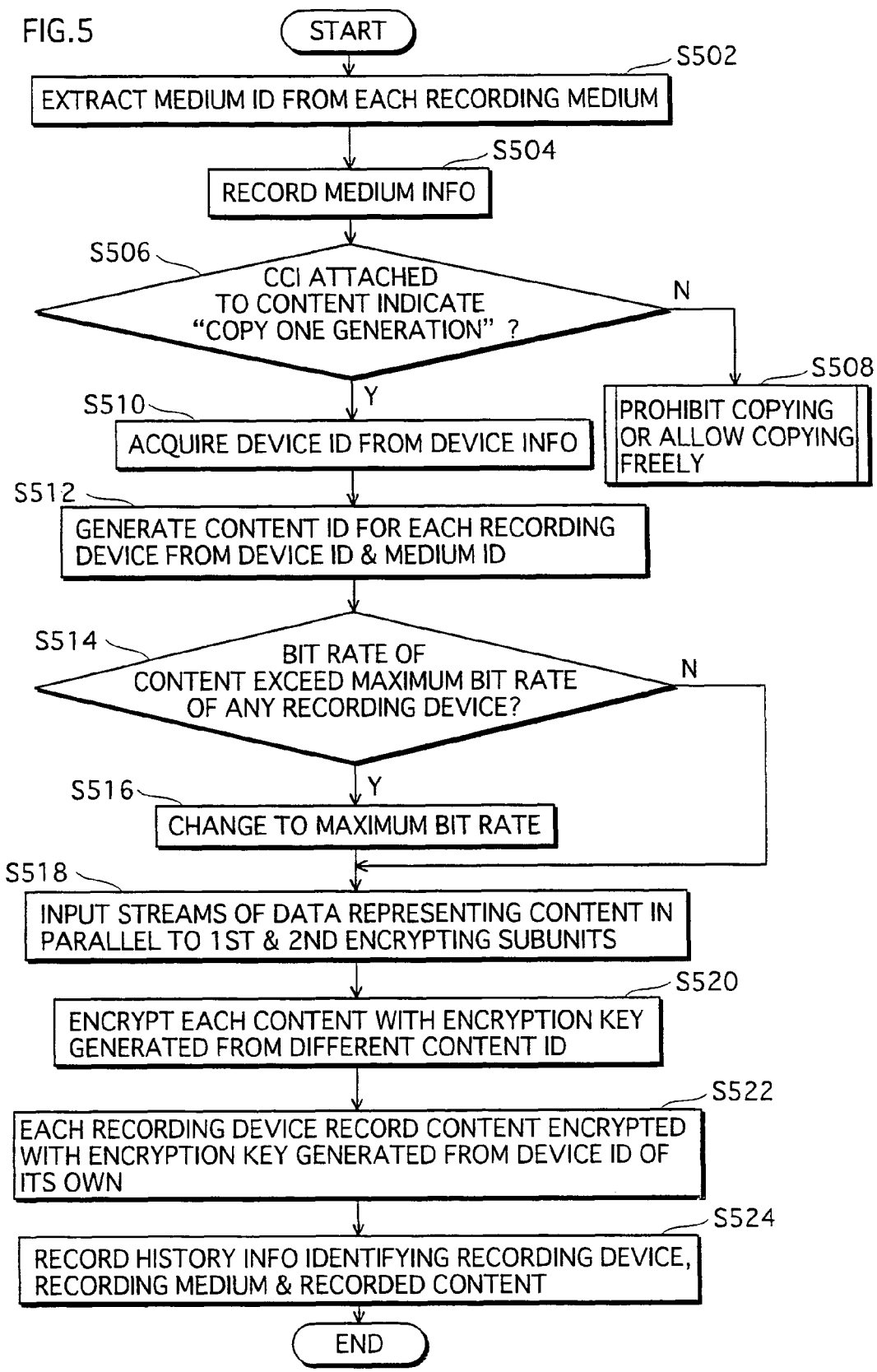

CONTENT RECORDING APPARATUS, METHOD FOR CONTROLLING THE CONTENT RECORDING APPARATUS, AND RECORDING PROGRAM FOR THE CONTENT RECORDING APPARATUS

This application is based on an application No. 2004-299292 filed in Japan, the contents of which are hereby incorporated by reference.

BACKGROUND OF THE INVENTION (1) Field of the Invention

The present invention relates to a content recording apparatus for recording digital content carried on data streams of video and audio signals. The present invention also relates to a method for controlling the content recording apparatus.

(2) Description of the Related Art

In the field of TV broadcasting, terrestrial digital broadcasting has recently been launched. In response to this, content recording apparatuses capable of long hours of recording are widely available on the market. Normally, such a content recording apparatus is equipped with a plurality of recording devices, such as a combination of an HDD device and a DVD recorder.

Unlike analog copying of a video tape, digital content can be copied easily and without any degradation in quality. Furthermore, copying of digital content is possible for an unlimited number of times.

In order to address the above problems in copyright protection, digital content is attached with copy control information (hereinafter, "CCI") that restricts copying of the content. CCI indicates one of the following three states: "Copy Freely", "Copy Never", and "Copy One Generation".

With the "Copy Freely" status, the digital content is allowed to be freely copied. With the "Copy Never" status, the digital content is prohibited from being copied but playback of the content is allowed.

With the "Copy One Generation" status, the digital content is allowed to be copied once only. After being copied, the status of the digital content is changed to "Copy Never".

Currently, a recording apparatus manages stored content using a single apparatus ID unique to the recording apparatus, even if the recording apparatus is equipped with an HDD and a DVD recorder. For this reason, when content previously recorded by the HDD on HD is recorded by a DVD recorder on a DVD, this operation is regarded as copying of the content. Thus, the content must be "moved" which means that the originally stored content must be erased from the HD. Such a technique is disclosed for example in JP patent application publication No. 2002-245718.

Unfortunately, a content recording apparatus as above has a disadvantage. Considering the case where the content recording apparatus records the content labeled as "Copy One Generation" on the HD by the HDD. In order to play back the content stored in the HD with an external player, the stored content needs to be moved from the HD to a DVD using the DVD recorder, which requires a certain amount of time.

In addition, there is another disadvantage in the case where the HDD and the DVD recorder differ in their recording bit rates. More specifically, when the recording bit rate of DVD recorder is lower than that of the HDD, once content is moved to a DVD at the lower bit rate, it is no longer possible to store the content back to the HD at the higher bit rate ensuring the original high image quality.

SUMMARY OF THE INVENTION

A first object of the present invention is to eliminate the need to perform a move operation and thus save time required for the move operation.

A second object of the present invention is to prevent image degradation of content caused as a result of a move operation performed between recording devices of different recording bit rates.

To achieve the first object stated above, the present invention provides a content recording apparatus for recording content that is received from an external source and attached with copy control information. The content recording apparatus includes: at least two recording devices; a stream data output unit operable to output streams of data each separately representing the content in parallel for the respective recording devices, when the copy control information indicates a predetermined status; and an encrypting unit having encrypting subunits provided one for each recording device, each encrypting subunit being operable to encrypt, with a different encryption key, a different one of the streams of data received from the stream data output. unit. Each recording device records the stream of data encrypted by a corresponding one of the encrypting subunits.

With the structure stated above, the received content is separately recorded by at least two recording devices. Consequently, it is not necessary to perform a move operation to move the content recorded by one recording device to the other, so that the time that would otherwise be required for the move operation is saved.

Here, the predetermined status may be "Copy One Generation".

With the structure stated above, even the content labeled as "Copy One Generation" is separately recorded to every recording device incorporated in the content recording apparatus. That is, copies of the same generation are produced within the content recording apparatus as many as the number of recording devices incorporated.

Here, the content recording apparatus may further include: a device information storage unit operable to store device information which includes device IDs identifying the respective recording devices; an extracting unit operable to extract, from a recording medium mounted on each recording device, a medium ID identifying the recording medium; a medium information recording unit operable to record medium information indicating which recording medium is mounted to which recording device; and a content ID generating unit operable to generate content IDs each from a device ID identifying one of the recording device and a medium ID identifying a recording medium mounted to said one of the recording devices. Each encrypting subunit generates the encryption key from a content ID that is generated from a device ID of a corresponding recording device.

With the structure stated above, copies of the content recorded in more than two recording mediums are all encrypted with different encryption keys, so that copyright protection is ensured on a medium-by-medium basis.

Here, each recording device may mutually differ in a maximum bit rate at which the recording device is capable of recording a stream of data. The device information may further include a maximum bit rate of each recording device. The stream data output unit may include a rate changing subunit operable, if the content is input at a bit rate exceeding the maximum bit rate of any recording device, to change a bit rate at which the stream of data is output to one of the encrypting subunits corresponding to the recording device of which maximum bit rate is exceeded.

With the structure stated above, it is avoided that the input content cannot be recorded owing to the capability of each recording device.

Here, the medium information may further include free storage capacities remaining in the respective recording mediums. On receiving a user input specifying a recording time and a recording device, the rate changing subunit may (i) acquire a free storage capacity remaining in a recording medium mounted to the specified recording device, (ii) calculate a bit rate at which the entire content is recordable onto the recording medium, and (iii) change to the calculated bit rate a bit rate at which the stream of data is output to one of the encrypting subunits corresponding to the specified recording device, if the bit rate at which the content is input exceeds the calculated bit rate.

With the structure stated above, it is ensured that the content is recorded in a manner to be fit within the free capacity remaining in the recording medium.

Here, the content recording apparatus may further include: a history information storage unit operable to store history information including recording histories each identifying content recorded by one of the recording devices onto a recording medium; a judging unit operable, upon detachment of a recording medium from any of the recording devices, to search through the history information to judge whether any recording medium other than the recording medium to be detached stores content identical to any content stored in the recording medium to be detached; and a prohibiting unit operable, if the judging unit judges affirmatively, to record prohibition information to the history information, so that the identical content stored in said other recording medium is prohibited from being played or edited.

With the structure stated above, the copy control information indicating the "Copy One Generation" status is substantially complied with.

To achieve the second object stated above, the present invention provides the content recording apparatus that further includes a prohibition removing unit operable, when the recording medium once detached is re-mounted to the recording device, to remove the prohibition by erasing the prohibition information.

With the structure stated above, degradation of the image quality of content is prevented. Conventionally, once content is recorded by a recording device at a bit rate lower than the recording bit rate of another recording device, the original image quality is never restored because the content recorded at the lower bit rate is copied to the other recording device capable of recording at a higher bit rate. With the structure stated above, however, the content recorded at the higher bit rate is not deleted but preserved, so that the degradation of image quality is avoided.

Here, the content recording apparatus may further include: a history information storage unit operable to store history information including recording histories each identifying content recorded by one of the recording devices onto a recording medium; a judging unit operable, when content stored in a recording medium mounted to one of the recording devices is being played or edited, to judge whether any other recording medium storing content identical to the content being played or edited is mounted to any of the recording devices; a prohibiting unit, if the judging unit judges affirmatively, to record prohibition information to the history information, so that said other recording medium storing the identical content is prohibited from being detached; and a prohibition removing unit operable, upon completion of the playback or editing of the content, to remove the prohibition by erasing the prohibition information.

With the structure stated above, when the content is labeled as "Copy One Generation", copies of the content stored on two or more different recording mediums are never available at the same time. Consequently, the copy control information indicating the "Copy One Generation" status is substantially complied with.

In another aspect, the present invention provides a method of controlling a content recording apparatus having at least two recording devices for recording content that is input from an external source and attached with copy control information. The method includes the steps of: outputting streams of data each separately representing the content in parallel for the respective recording devices, when the copy control information indicates a predetermined status; and encrypting the streams of data with different encryption keys corresponding to the respective recording devices. Each recording device records the stream of data encrypted with a corresponding one of the encryption keys.

With the method stated above, the content recording apparatus can be saved from the need and time for performing a move operation of content attached with predetermined copy control information.

In yet another aspect, the present invention provides a program run by a content recording apparatus having at least two recording devices for recording content that is input from an external source and attached with copy control information. The program includes code operable to cause the apparatus to perform: outputting streams of data each separately representing the content in parallel for the respective recording devices, when the copy control information indicates a predetermined status; and encrypting the streams of data with different encryption keys corresponding to the respective recording devices. Each recording device records the stream of data encrypted with a corresponding one of the encryption keys.

By executing the program stated above on a content recording apparatus provided with at least two recording devices, it is ensured to save the need and time for performing a move operation of content attached with predetermined copy control information.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows an example of device information stored in a device information storage unit shown in FIG. 1;

FIG. 3 shows an example of medium information stored in a medium information storage unit shown in FIG. 1;

FIG. 4A shows an example of history information stored in a history information storage unit shown in FIG. 1;

FIG. 4B shows an example of history information to which restriction information is added upon detachment of a recording medium;

FIG. 5 shows a flowchart of processing steps performed by the content recording apparatus;

DESCRIPTION OF THE PREFERRED EMBODIMENT

Hereinafter, a description is given to an embodiment of a content recording apparatus according to the present invention, with reference to the accompanying drawings.

Preferred Embodiment

Figure 1:
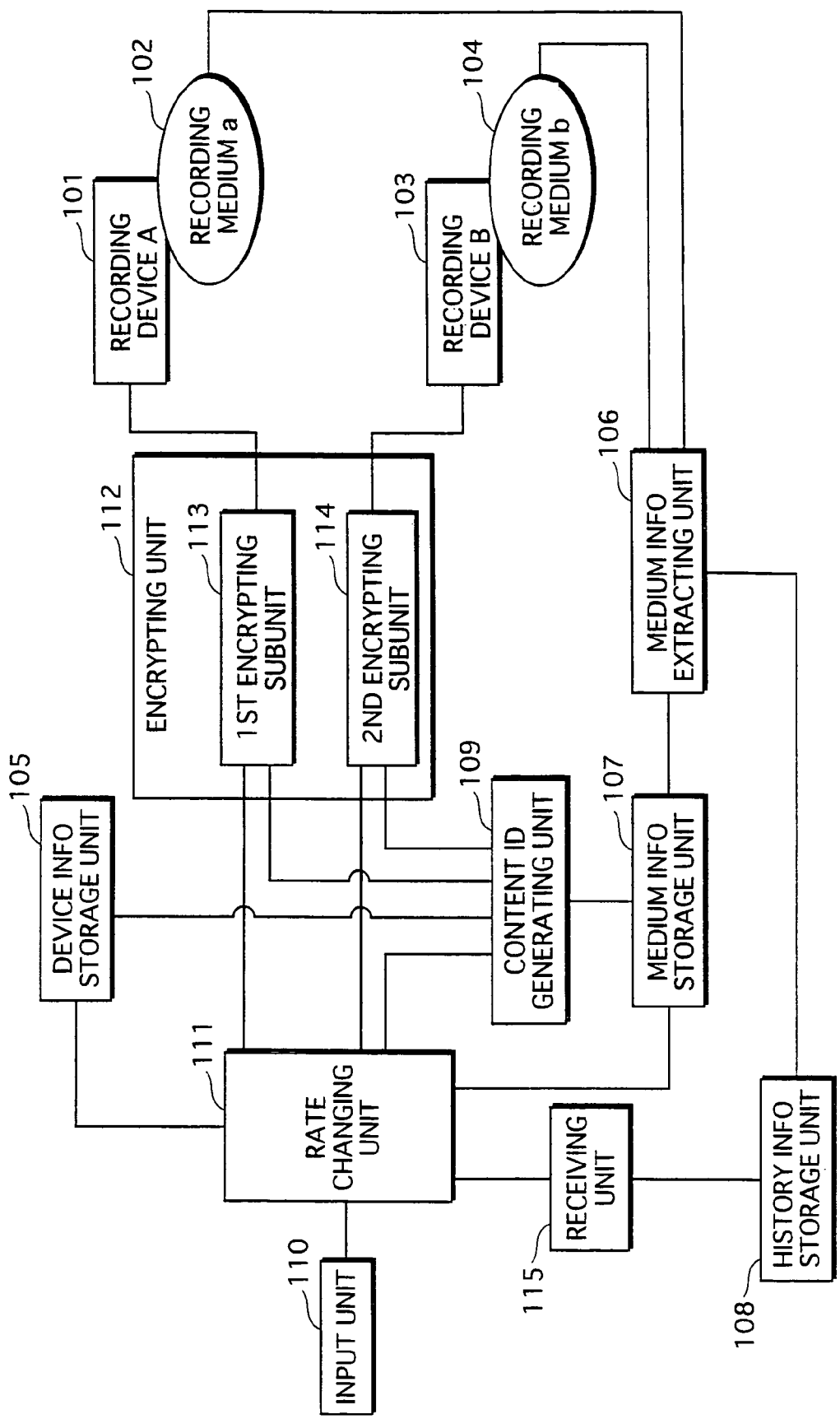
FIG. 1 is shows the structure of a content recording apparatus according to an embodiment of the present invention.

FIG. 1 shows the structure of the content recording apparatus according to the embodiment of the present invention.

The content recording apparatus is composed of a recording device A 101, a recording medium a 102 mounted on the recording device A 101, a recording device B 103, a recording medium b 104 mounted on the recording device B 103, a device information storage unit 105, a medium information extracting unit 106, a medium information storage unit 107, a history information storage unit 108, a content ID generating unit 109, an input unit 110, a rate changing unit 111, an encrypting unit 112, and a receiving unit 115. The encrypting unit 112 is composed of a first encrypting subunit 113 and a second encrypting subunit 114.

The recording device A 101 may be implemented by a DVD recorder, and is capable of recording data for example at the bit rate of 11 Mbps at maximum. The recording device A 101 is assigned a device ID of "AAAA".

The recording device A 101 records content encrypted by the first encrypting subunit 113 on the recording medium a 102.

The recording medium a 102 may be implemented by a DVD-RAM detachable from the recording device A101. The recording medium a 102 is assigned a medium ID of "aaaa".

The recording device B 103 may be implemented by an HDD and is capable of recording data at the rate of 24 Mbps at maximum. The recording device B 103 is assigned a device ID of "BBBB".

The recording device B 103 records content encrypted by the second encrypting subunit 114 onto the recording medium b 104.

The recording medium b 104 may be implemented by an HDD that is not detachable from the recording device B 103. The recording medium b 104 is assigned a medium ID of "bbbb"

The device information storage unit 105 stores device information relating to the recording devices that are incorporated in the content recording apparatus. The device information storage unit 105 may be implemented by a ROM.

FIG. 2 shows an example of the device information stored in the device information storage unit 105. The device information 201 is a table composed of a recording device column 202, a device ID column 203, a maximum bit rate column 204, and a type column 205.

The recording device column 202 stores the names of the recording devices that are incorporated in the content recording apparatus. The device ID column 203 stores the IDs of the recording devices. The maximum bit rate column 204 stores the maximum bit rates of the recording devices. The type column 205 stores the types of the recording devices.

Note that the device information 201 is stored in advance, after incorporation of the recording devices A 101 and B 103 into the content recording apparatus.

Upon mounting of the recording medium a 102 to the recording device A 101 or of the recording medium b 104 to the recording device B103, the medium information extracting unit 106 extracts medium information from the mounted recording medium. In addition, upon recording of content on the recording medium a 102 orb 104, the medium information extracting unit 106 extracts the medium information from that recording medium. The thus extracted medium information is recorded into the medium information storage unit 107.

Upon mounting of the recording medium a 102 or b 104, the medium information extracting unit 106 extracts the medium information recorded in a secure area of the recording medium, and also extracts the type and storage capacity of recording medium.

Upon recording of content on the recording medium a 102 or b 104, the medium information extracting unit 106 extracts the free capacity remaining in the recording medium and updates with respect to the remaining free capacity, the medium information stored in the medium information storage unit 107.

Further, the medium information extracting unit 106 acquires content information relating to the recorded content. The acquired content information is recorded in the history information storage unit 108, in association with the recording medium on which the content is recorded.

The content information includes the recording date and time, channel number, title, and bit rate of the recorded content.

When the recording medium a 102 once detached is remounted to the recording device A 101, the medium information extracting unit 106 refers to the history information stored in the history information storage unit 108 to judge if the same content is stored in both the recording mediums a 102 and b 104. If the same content is stored, the medium information extracting unit 106 erases restriction information that prohibits the content stored in the recording medium b 104 from being played or processed. As a result, the content originally stored in the recording medium b 104 is allowed to be played and processed. Since the content stored in the recording medium b 104 is the one originally recorded rather than a copied version of the content stored in the recording medium a 102, the image quality of the content is retained high.

The medium information storage unit 107 maybe implemented by a RAM, and stores medium information.

FIG. 3 shows an example of the medium information stored in the medium information storage unit 107. The medium information 301 is a table composed of a recording device column 302, a mounted medium column 303, a medium ID column 304, and a free capacity column 305.

The recording device column 302 stores the names of recording devices to which the respective recording mediums are mounted. The mounted medium column 303 stores the types of recording mediums mounted to the respective recording devices. The medium ID column 304 stores the medium IDs identifying the respective recording mediums. The free capacity column 305 sores the free (i.e. non-used) capacities remaining in the respective recording mediums.

The history information storage unit 108 may be implemented by a RAM, and stores content information relating to content stored in the recording mediums a 102 and b 104.

FIG. 4A is an example of the history information stored in the history information storage unit 108. The history information 401 is a table composed of a recording device column 402, a medium ID column 403, and a content information column 404.

The recording device column 402 stores the names of recording device to which the respective recording mediums are mounted. The medium ID column 403 stores the medium IDs identifying the respective recording mediums.

The content information column 404 stores pieces of content information identifying stored content. Each piece of content information is composed of the recording date and time, channel number, and title of the content, as well as of the bit rate of the stream data representing the content.

Note that the history information 401 includes only information pertinent to the recording mediums a 102 and b 104 that are currently mounted. Yet, if any other recording medium has been mounted to the recording device A 101 and content has been recorded to the recording medium, the recording history is naturally included in the history information.

FIG. 4B shows history information updated at the time the recording medium a 102 is detached from the recording device A 101. As a result of the update, the history information 401 is additionally composed of a restriction information column 405. As shown in the history information 401, the content titled "News 2" is stored in both the recording mediums a 102 and b 104, and the restriction information column 405 stores prohibition information prohibiting playback and editing of the content titled "News 2" that is stored in the recording medium b 104. When the prohibition information is attached, the content recording apparatus no longer permits the content to be played or edited.

Upon mounting of the recording medium a 102 back to the recording device A, the medium information extracting unit 106 erases the prohibition information as described above. As a result, the content titled "News 2" stored in the recording medium b 104 is again permitted to be played and edited.

When started by the rate changing unit 111, the content ID generating unit 109 reads the device ID of the recording device A 101 form the device information storage unit 105 and also reads the medium ID of the recording medium a 102 from the medium information storage unit 107. Using the thus read device and medium IDs, the content ID generating unit 109 generates a content ID and passes the thus generated content ID to the first encrypting subunit 113, which corresponds to the recording device A 101. Similarly, the content ID generating unit 109 reads the device ID of the recording device B 103 and the medium ID of the recording medium b 104, generates a content ID using the thus read device and medium IDs, and passes the thus generated content ID to the second encrypting subunit 114, which corresponds to the recording device B 103. Naturally, the content IDs passed to the first and second encrypting subunits 113 and 114 are different from each other.

On receiving or acquiring stream data representing content, the input unit 110 judges whether CCI attached to the content indicates the "Copy One Generation" status or any other status. If it is judged that the CCI indicates "Copy One Generation" status, the input unit 110 inputs the data stream to the rate changing unit 111.

Upon receipt of the stream data, the rate changing unit 111 starts the content ID generating unit 109.

The rate changing unit 111 reads from the device information storage unit 105 the maximum bit rates of the recording devices A 101 and B 103 and compares the maximum bit rates with the bit rate of the input stream data to judge whether the bit rate exceeds any of the maximum bit rates. Suppose, for example, the stream data is input at the bit rate of 22 Mbps. Since this bit rate is twice as high as the maximum bit rate of the recording device A 101, the rate changing unit 111 changes the bit rate, so that the stream data is input at the bit rate of to 11 Mbps to the first encrypting subunit 113, which is provided for the recording device A 101. On the other hand, the maximum bit rate of the recording device B 103 is 24 Mbps and thus not exceeded. Consequently, the rate changing unit inputs the stream data to the second encrypting subunit 114 at the original bit rate of 22 Mbps.

On receiving from the receiving unit 115 the name of specified recording device and the specified recording time, the rate changing unit 111 reads, from the medium information stored in the medium information storage unit 107, the free capacity R [MB] remaining in the recording medium mounted to the specified recording device. The rate changing unit 111 then judges whether the following equation is satisfied:

$R \geq (I \times T \times 60)/8$, where I denotes the bit rate [Mbps] at which the stream data is input and T denotes the recording time [min].

If the equation is satisfied, the stream data is inputted at the original bit rate to one of the first and second encrypting subunits 113 and 114 corresponding to the specified recording device.

Suppose, for example, the original bit rate is 8 Mbps, the free capacity remaining in the recording medium a 102 is 200 MB, and the recording time is 10 minutes. In this case, the rate changing unit 111 substitutes I=8 and T=10 into the equation (1) to calculate the free capacity R' [MB] necessary to store the entire content.

$$R' = (I \times T \times 60)/8 \qquad (1)$$

As a result, it is calculated that R'=600.

Since the value of R' is larger than R=200, the rate changing unit 111 changes the bit rate of the stream data to the first encrypting subunit 113 to satisfy I'=I×R/R'. That is, the stream data is input to the first encrypting subunit 113 at the bit rate of 8/3 Mbps. With this bit rate, the content worth ten minutes of recording time is duly and entirely stored into the remaining free area of the recording medium a 102. Yet, the thus recorded content is of degraded image quality since the bit rate is lowered.

As mentioned above, the encrypting unit 112 is composed of the first and second encrypting subunits 113 and 114 provided for the recording devices A 101 and B 103, respectively.

The first encrypting subunit 113 generates an encryption key from a content ID received from the content ID generating unit 109, and encrypts the stream data representing the content received from the rate changing unit 111 with the thus generated encryption key. The encrypted content is output to the recording device A 101.

Similarly, the second encrypting subunit 114 generates an encryption key using another content ID received from the content ID generating unit 109, and encrypts the stream data (i.e. the content) with the thus generated encryption key. The encrypted content is output to the recording device B 103.

Note that the content ID passed to the first encrypting subunit 113 is generated from the device ID "AAAA" and the medium ID "aaaa", whereas the content ID passed to the second encrypting subunit 114 is generated from the device ID "BBBB" and the medium ID "bbbb". Thus, the content IDs used by the first and second encrypting subunits 113 and 114 to generate encryption keys are different from each other. Naturally, the encryption keys generated by the first and second encrypting subunits 113 and 114 are different from each other.

The receiving unit 115 receives a user operation on a menu screen displayed on a display unit (not illustrated). On receiving a user input specifying the name of recording device and the recording time, the receiving unit 115 passes the received information to the rate changing unit 111.

The receiving unit 115 receives a user input specifying a recording medium to be detached, which in this example is the recording medium a 102. Upon receipt of the user input, the receiving unit 115 searches through the history information 401 stored in the history information storage unit 108 to judge whether any piece of content information stored with the medium ID "aaaa" of the recording medium a 102 matches any piece of content information stored with the medium ID "bbbb". If there is no match, the receiving unit 115 instructs a control unit (not illustrated) to detach the recording medium a.

On the other hand, when there is a matching piece of content information stored with the medium ID "bbbb", the receiving unit 115 records in the restriction information column 405 information prohibiting playback and editing of the content identified by the matching piece of content information.

With this arrangement, after the recording medium a 102 is detached, the control unit prohibits playback and other operation of the content that is stored in the recording medium b 104 and that is identical to one stored in the recording medium a 102. That is, the content bound by the CCI indicating the "Copy One Generation" status is virtually available only within the condition permitted by the CCI, and thus the copyright of the content is protected.

Next, a description is given to processing steps of the present embodiment with reference to flowcharts shown in FIGS. 5-8.

FIG. 5 shows a flowchart of processing steps performed by the content recording apparatus at the time of recording a content attached with CCI indicating "Copy One Generation" status.

First, when the recording mediums a 102 and b 104 are mounted to the recording devices A 101 and B 103, respectively, the medium information extracting unit 106 extracts the medium ID and the free capacity from each recording medium (S502), and records the read information as medium information to the medium information storage unit 107 (S504).

On receiving content that is input or acquired from an external source, the input unit 110 judges whether CCI attached to the content indicates the "CopyOne Generation" status (S506) If the indicated status is other than the "Copy One Generation", the content recording apparatus is prohibited from copying the content or allowed to freely copy the content (S508). Yet, this processing is not particularly relevant to the gist of the present invention and thus no description is given.

On the other hand, when the content is labeled as "Copy One Generation", the input unit 110 outputs the stream data representing the content to the rate changing unit 111.

In response, the rate changing unit 111 starts the content ID generating unit 109. The content ID generating unit 109 acquires from the device information storage unit 105 the device IDs of the recording devices A 101 and B 103, which are "AAAA" and "BBBB", respectively. In addition, the rate changing unit 111 acquires from the medium information storage unit 107 the medium IDs of the recording mediums a 102 and b 104, which are "aaaa" and "bbbb", respectively (S510). The rate changing unit 111 then generates content IDs for use by the recording devices A 101 and B 103, from the respective device IDs and the medium IDs (S512). The rate changing unit 111 then passes the respective content IDs to the first and second encrypting subunits 113 and 114.

Next, the rate changing unit 111 judges whether the current bit rate of the stream data representing the content exceeds of the maximum bit rate of any of the recording devices A 101 and B 103 (S 514). The maximum bit rate of each recording device is stored in the device information storage unit 105. If any of the maximum bit rates is exceeded (S514: Y), the rate changing unit 111 changes the bit rate of the data stream directed via the encrypting unit 112 to the recording device of which maximum bit rate is exceeded, so that the data stream is input at the maximum rate of the recording device (S516).

The rate changing unit 111 inputs the stream data in parallel to the first and second encrypting subunits 113 and 114, which correspond to the recording devices A 101 and B 103, respectively (S518). Note that the stream data is input at the bit rate as changed in the step S516 or otherwise at the bit rate as originally received by the input unit 110.

The first encrypting subunit 113 encrypts the input stream data with an encryption key generated from a corresponding on to the content IDs that are generated by and received from the content ID generating unit 109. Similarly, the second encrypting subunit 114 encrypts the input stream data with an encryption key generated from the other content ID that is generated and received from the content ID generating unit 109 (S520).

The recording device A 101 records the content encrypted by the first encrypting subunit 113 onto the recording medium a 102, whereas the recording device B 103 records the content encrypted by the second encrypting subunit 114 onto the recording medium b 104 (S522).

Upon completion of recording of the content to the recording medium a 102 and to the recording medium b 104, the medium information extracting unit 106 updates the history information stored in the history information storage unit 108, by adding, for each recording medium to which the content is recorded, the name of the recording device, the medium ID, and content information identifying the content. In addition, the medium information extracting unit 106 updates, with respect to the free capacity column 305, the medium information stored in the medium information storage unit 107 (S524).

Figure 6:
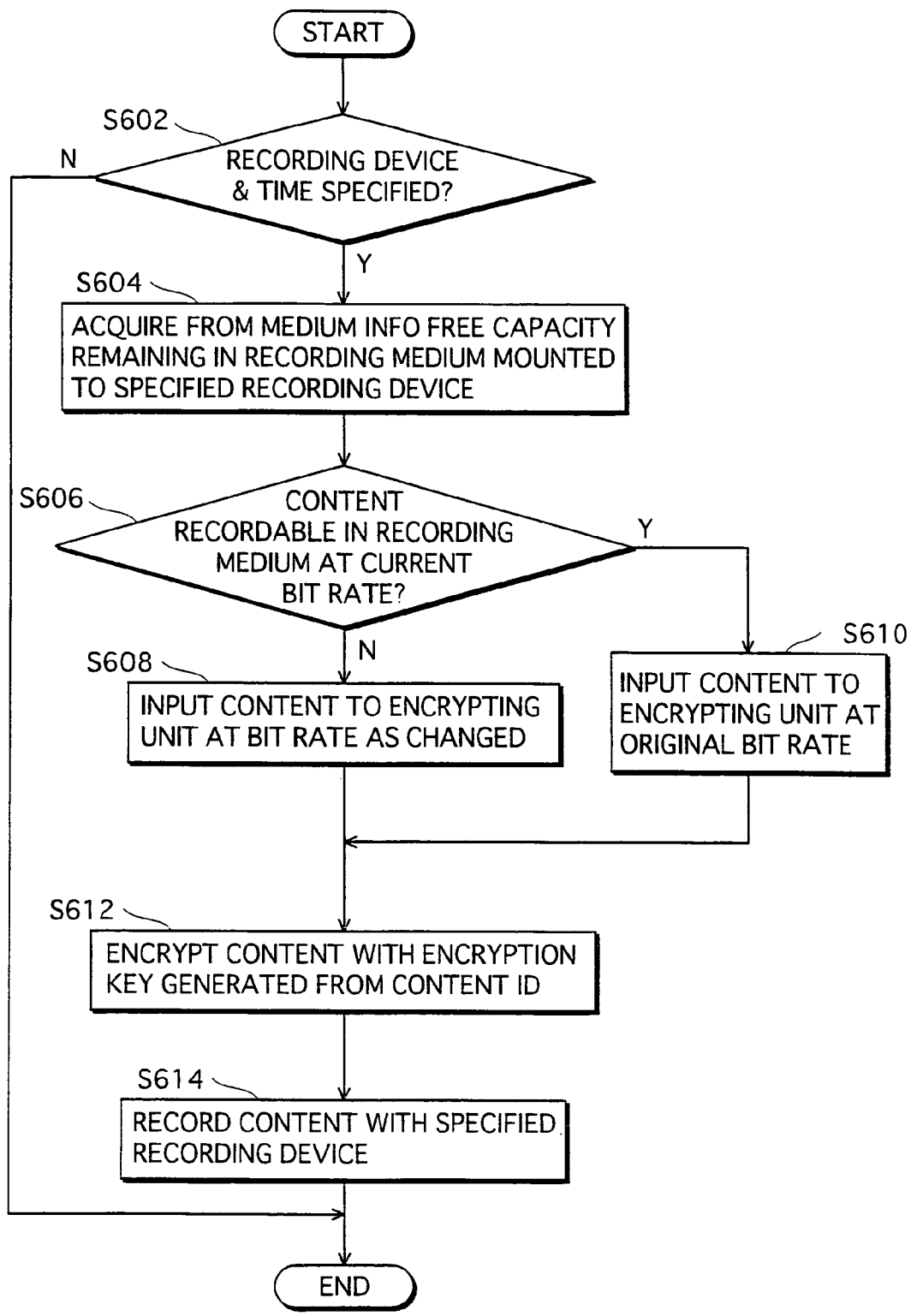
FIG. 6 shows a flowchart of processing steps performed by the content recording apparatus.

FIG. 6 shows a flowchart of processing steps performed for recording content to the recording medium mounted to the recording device specified by a user. The recording device other than the user-specified device performs the processing steps shown in FIG. 5. In the description below, no description is given to the processing steps overlapping the description given with reference to FIG. 5.

First, upon receipt of a user input specifying the recording time and either of the recording devices A 101 and B 103 (S602: Y), the receiving unit 115 informs the rate changing unit 111 about the specified one of the recording devices and recording time.

The rate changing unit 111 acquires from the medium information storage unit 107 the free capacity remaining in the recording medium mounted to the specified recording device (S604).

The rate changing unit 111 performs calculation to judge if the stream data representing the content can be fully recorded on the recording medium at the current bit rate (S606).

If it is judged that the entire. content can not be recorded at the current bit rate (S606: N), the rate changing unit 111 changes the bit rate of the stream data and inputs the stream data at the changed bit rate to one of the encrypting subunits corresponding to the specified recording device (S608). On the other hand, if it is judged that the entire stream data is recordable at the current bit rate (S606: Y), the rate changing unit 111 inputs the stream data at the current bit rate to one of the encrypting subunits corresponding to the specified recording device (S610).

The first or second encrypting subunit 113 or 114 encrypts the received stream data with an encryption key generated from a content ID having been received from the content ID generating unit 109 (S612).

The encrypted content is recorded on a corresponding one of the recording mediums a 102 and b 104 by the specified one of the recording devices A 101 and B 103.

Figure 7:
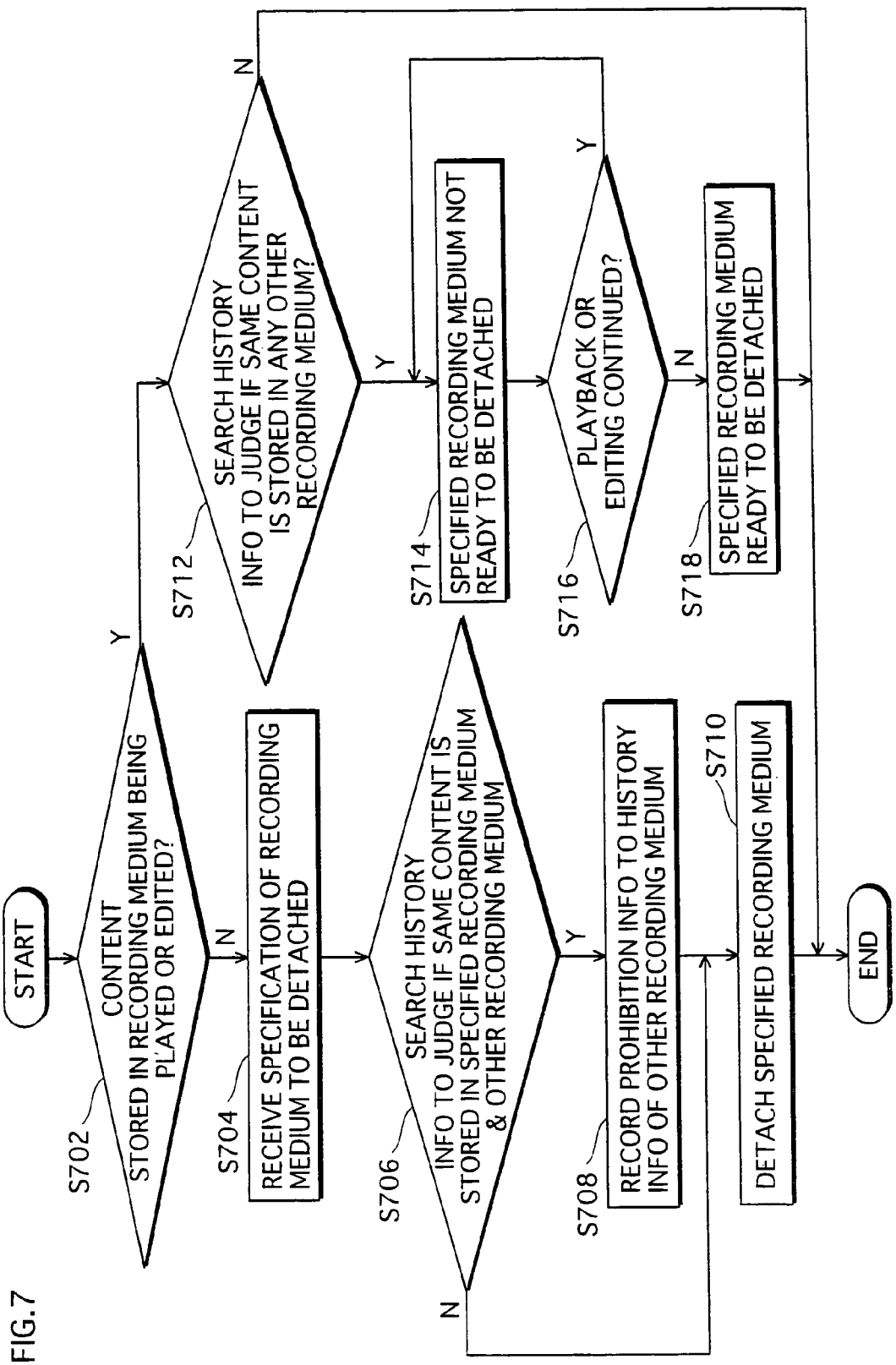
FIG. 7 shows a flowchart of processing steps performed by the content recording apparatus.

Next, with reference to the flowchart shown in FIG. 7, a description is given to processing steps performed for detaching the recording medium a.

Note that the present embodiment relates to the case where two recording devices are provided and the recording medium a is the one that is detachable. Yet, it should be naturally appreciated that there may be three or more recording devices provided, and more than two of the recording devices may be detachable. When, for example, four recording devices are provided, the encrypting unit 112 is additionally provided with third and fourth encrypting subunits. The flowchart shown in FIG. 7 relates to the case where a plurality of recording mediums is detachable.

First, the control unit (not illustrated) controlling overall operation of the content recording apparatus judges whether content stored in any of the recording mediums is being played back or edited (S702).

If it is judged neither playback nor editing is being performed (S702: N), the receiving unit 115 receives a user input specifying a recording medium to be detached (S704). In response, the receiving unit 115 searches through the history information stored in the history information storage unit 108 to judge whether any recording medium other than the specified one stores content identical to the content stored in the specified recording medium (S706).

On judging that there is identical content stored in any other recording medium (S706: Y), the receiving unit 115 adds prohibition information to the history information, so that playback or editing of the identical content stored in said other recording medium is prohibited (S708).

After recording the prohibition information (S708) or on judging that there is no identical content stored in any other recording medium (S706: N), the specified recording medium is detached (S710), and then the processing is completed.

If it is judged in the step S702 that content is being played or edited, the control unit (not illustrated) searches through the history information stored in the history information storage unit 108 to judge if any content identical to the currently processed content is stored in any other recording medium (S712). If it is judged that no such content is stored in any other recording medium (S716: N), the specified recording medium is determined to be in readiness for detachment (S718) and thus the processing is terminated. On the other hand, if it is judged that playback or editing of content is being processed (S716:Y), it is determined that the specified recording medium is not in a state of readiness for detachment (S714). The specified recording medium is brought into a state of readiness for detachment upon completion of the playback or editing (S716:Y). The processing is then terminated.

Figure 8:
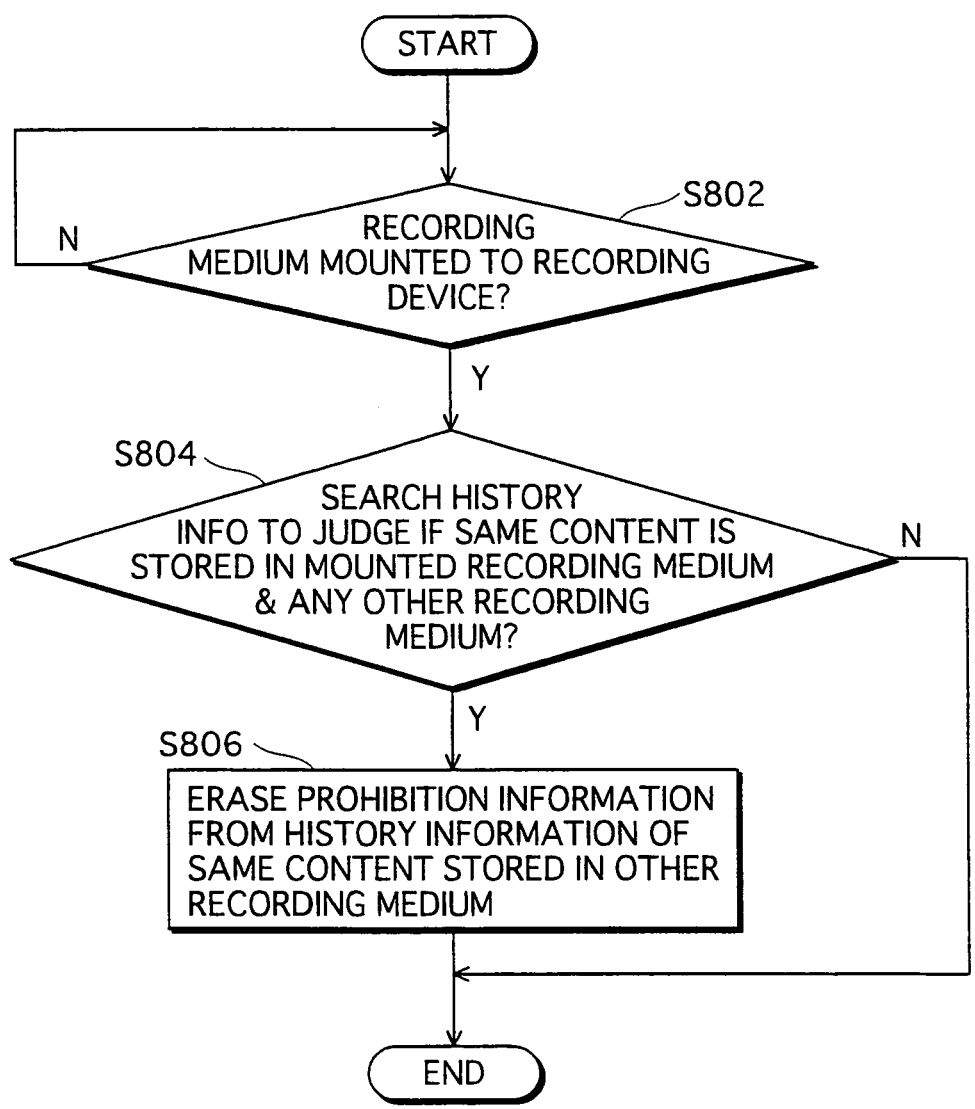
FIG. 8 shows a flowchart of processing steps performed by the content recording apparatus.

Next, with reference to the flowchart shown in FIG. 8, processing steps performed by the content recording apparatus upon re-mounting of the recording medium once detached from the content recording apparatus.

Upon mounting of the recording medium a 102 to the recording device A 101 (S802: Y), the medium information extracting unit 106 searches through the history information stored in the history information storage unit 108 to judge whether any content identical to the content stored in the recording medium a 102 identified by the medium ID "aaaa" is stored in any other recording, medium, which in this example is the recording medium b 104 identified by the medium ID "bbbb" (S804). When it is judged that identical content is stored in the recording medium b 104 (S804:Y), the medium information extracting unit 106 allows playback and editing of the identical content stored in the recording medium b 104, by erasing the prohibition information (S806). The processing is then terminated. If it is judged in the step S804 that no identical content is stored in any other recording medium, the processing is also terminated.

Note although the structure of the above embodiment is shown in FIG. 1, the functions of the respective components may be embodied in form of a computer program causing a computer to perform the functions.

The present invention is applicable for example to a receiver for digital terrestrial TV broadcasting and usable in the field of home appliances makers.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content recording apparatus for recording content that is received from an external source and attached with copy control information, comprising:

at least two recording devices;

a stream data output unit configured to judge whether the copy control information indicates a predetermined status or not, and upon judging that the copy control information indicates the predetermined status, to output streams of data in parallel, each of the streams of data separately representing the content and corresponding to the respective recording devices;

an encrypting unit having encrypting subunits corresponding one-to-one to the recording devices, each of the encrypting subunits being configured to encrypt, with a different encryption key, a different one of the streams of data received from the stream data output unit;

a history information storage unit configured to store history information including recording histories each identifying content recorded by each of the recording devices; and a receiving unit configured, after detecting operation for detachment of a recording medium from any one of the recording devices, to search through the history information to judge whether another recording medium, which is attached to the content recording apparatus and is other than the recording medium to be detached, stores content identical to any content stored in the recording medium to be detached, wherein each of the recording devices is configured to record a corresponding one of the streams of data encrypted by a corresponding one of the encrypting subunits, wherein each of recorded streams of data is encrypted using an encryption key being different from each other, and wherein the receiving unit is configured, if the receiving unit judges affirmatively, to record prohibition information to the history information, so that the identical content stored in said another recording medium is prohibited from being played or edited.

2. The content recording apparatus according to claim 1, wherein
the stream data output unit is configured to output the streams of data according to the copy control information indicating a status that the content is allowed to be copied only once.

3. The content recording apparatus according to claim 2, further comprising:
a device information storage unit configured to store device information which includes device IDs identifying the respective recording devices;
an extracting unit configured to extract, from a recording medium mounted on each recording device, a medium ID identifying the recording medium;
a medium information recording unit configured to record medium information indicating which recording medium is mounted to which recording device; and
a content ID generating unit configured to generate content IDs each from a device ID identifying one of the recording devices and a medium ID identifying a recording medium mounted to said one of the recording devices, wherein
each of the encrypting subunits is configured to generate the encryption key from a content ID that is generated from a device ID of a corresponding one of the recording devices.

4. The content recording apparatus according to claim 3, wherein
the device information further includes a maximum bit rate of each recording device, and
the stream data output unit includes a rate changing subunit configured, if the content is input at a bit rate exceeding the maximum bit rate of any recording device, to change a bit rate at which the stream of data is output to one of the encrypting subunits corresponding to the recording device of which maximum bit rate is exceeded.

5. The content recording apparatus according to claim 4, wherein
the medium information further includes free storage capacities remaining in the respective recording mediums,
on receiving a user input specifying a recording time and a recording device, the rate changing subunit is configured to: (i) acquire a free storage capacity remaining in a recording medium mounted to the specified recording device, (ii) calculate a bit rate at which the entire content is recordable onto the recording medium, and (iii) change to the calculated bit rate a bit rate at which the stream of data is output to one of the encrypting subunits corresponding to the specified recording device, if the bit rate at which the content is input exceeds the calculated bit rate.

6. The content recording apparatus according to claim 4, wherein:
when detecting that the recording medium is re-mounted to one of the recording devices after once detached from the content recording apparatus, the extracting unit is configured to remove prohibition by erasing the prohibition information.

7. A content recording apparatus for recording content that is received from an external source and attached with copy control information, comprising:
at least two recording devices;
a stream data output unit configured to judge whether the copy control information indicates a predetermined status or not, and upon judging that the copy control information indicates the predetermined status, to output streams of data in parallel, each of the streams of data separately representing the content and corresponding to the respective recording devices;
an encrypting unit having encrypting subunits corresponding one-to-one to the recording devices, each of the encrypting subunits being configured to encrypt, with a different encryption key, a different one of the streams of data received from the stream data output unit;
a history information storage unit configured to store history information including recording histories each identifying content recorded by each of the recording devices; and
a receiving unit configured, when content stored in a recording medium mounted to any one of the recording devices is being played or edited, to judge based on the history information whether another recording medium storing content identical to the content being played or edited is mounted to the recording device corresponding to said another recording medium, wherein:
each of the recording devices is configured to record a corresponding one of the streams of data encrypted by a corresponding one of the encrypting subunits,
each of recorded streams of data is encrypted using an encryption key being different from each other, and
the receiving unit is configured:
if the receiving unit judges affirmatively, to record prohibition information to the history information, so that said other recording medium storing the identical content is prohibited from being detached; and
upon completion of the playback or editing of the content, to remove prohibition by erasing the prohibition information.

8. A method of controlling a content recording apparatus having at least two recording devices for recording content that is input from an external source and attached with copy control information, the method comprising the steps of:
judging whether the copy control information indicates a predetermined status or not;
outputting, when the copy control information indicates the predetermined status, streams of data in parallel, each of the streams of data separately representing the content and corresponding to the respective recording devices;
encrypting the streams of data with different encryption keys corresponding to the respective recording devices; and
recording, by each of the recording devices, a corresponding one of the streams of data encrypted with a corresponding one of the encryption keys,
wherein each of recorded streams of data is encrypted using an encryption key being different from each other,
the content recording apparatus further has a history information storage unit configured to store history information including recording histories each identifying content recorded by each of the recording devices, and
the method further comprises the steps of:
searching through the history information, after detecting operation for detachment of a recording medium from any one of the recording devices, to judge based on the history information whether another recording medium, which is attached to the content recording apparatus and is other than the recording medium to be detached, stores content identical to any content stored in the recording medium to be detached; and
recording, if the judgment is made affirmatively, prohibition information to the history information, so that the identical content stored in said another recording medium is prohibited from being played or edited.

9. A non transitory computer readable medium containing a program run by a content recording apparatus, the content recording apparatus having at least two recording devices for recording content that is input from an external source and attached with copy control information, the program comprising code, when executed by the content recording apparatus, to cause the content recording apparatus to perform:
judging whether the copy control information indicates a predetermined status or not;
outputting, when a copy control information indicates the predetermined status, streams of data in parallel, each of the streams of data separately representing the content and corresponding to the respective recording devices;
encrypting the streams of data with different encryption keys corresponding to the respective recording devices; and
recording a corresponding one of the streams of data encrypted with an corresponding one of the encryption keys, wherein:
the content recording apparatus further has a history information storage unit configured to store history information including recording histories each identifying content recorded by each of the recording devices, and
the method further comprises the steps of:
searching through the history information, after detecting operation for detachment of a recording medium from any one of the recording devices, to judge whether another recording medium, which is attached to the content recording apparatus and is other than the recording medium to be detached stores content identical to any content stored in the recording medium to be detached; and
recording, if the judgment is made affirmatively, prohibition information to the history information, so that the identical content stored in said another recording medium is prohibited from being played or edited.

10. The method according to claim 8, wherein
the step of outputting the streams of data is performed according to the copy control information indicating a status that the content is allowed to be copied only once.

11. The method according to claim 10, wherein
the content recording apparatus further includes a device information storage unit configured to store device information which includes device IDs identifying the respective recording devices,
the method further comprises the steps of:
extracting a media ID identifying a recording medium mounted on each of the recording devices;
recording medium information indicating which recording medium is mounted to which recording device;
generating content IDs each from a device ID identifying one of the recording devices and a medium ID identifying a recording medium mounted to said one of the recording devices, and
in the step of encrypting the streams of data, each of the encryption keys is generated from one of the content IDs that is generated from the device ID identifying a corresponding one of the recording devices.

12. The method according to claim 11, wherein
the device information further includes a maximum bit rate of each recording device, and
the stream data output step includes a sub-step of changing, if the content is input at a bit rate exceeding the maximum bit rate of any recording device, a bit rate at which the stream of data is output to one of the recording devices of which maximum bit rate is exceeded.

13. The method according to claim 12, wherein
the medium information further includes free storage capacities remaining in the respective recording mediums,
in the sub-step of changing the bit rate, the following steps of (i), (ii) and (iii) are performed in response to a user input specifying a recording time and a recording device: (i) acquiring a free storage capacity remaining in a recording medium mounted to the specified recording device; (ii) calculating a bit rate at which the entire content is recordable onto the recording medium; and (iii) changing a bit rate at which the stream of data is output to the calculated bit rate, if the bit rate at which the content is input exceeds the calculated bit rate.

14. The method according to claim 12, further comprising:
the step of removing, when the recording medium is remounted to one of the recording devices after once detached from the content recording apparatus, prohibition by erasing the prohibition information.

15. A method of controlling a content recording apparatus having at least two recording devices for recording content that is input from an external source and attached with copy control information, the method comprising the steps of:
judging whether the copy control information indicates a predetermined status or not;
outputting, when the copy control information indicates the predetermined status, streams of data in parallel, each of the streams of data separately representing the content and corresponding to the respective recording devices;
encrypting the streams of data with different encryption keys corresponding to the respective recording devices; and
recording, by each of the recording devices, a corresponding one of the streams of data encrypted with a corresponding one of the encryption keys,
wherein each of recorded streams of data is encrypted using an encryption key being different from each other,
the content recording apparatus further has a history information storage unit configured to store history information including recording histories each identifying content recorded by each of the recording devices, and
the method further comprises the steps of:
judging, when content stored in a recording medium mounted to any one of the recording devices is being played or edited, based on the history information whether another recording medium storing content identical to the content being played or edited is mounted to the recording device corresponding to said another recording medium;
recording, if the judgment is made affirmatively, prohibition information to the history information, so that said another recording medium storing the identical content is prohibited from being detached; and
removing, upon completion of the playback or editing of the content, prohibition by erasing the prohibition information.

16. The content recording apparatus according to claim 1, wherein
the stream data output unit comprises:
an input unit configured to judge whether the copy control information indicates the predetermined status or not, and
a rate changing unit configured to output streams of data in parallel, each of the streams of data separately representing the content and corresponding to the respective recording devices, when the rate changing unit receives original stream of data representing the content from the input unit.

17. The method according to claim 8, wherein
the step of judging comprises judging whether the copy control information indicates the predetermined status or not by using an input unit, and
the step of outputting comprises outputting streams of data in parallel, each of the streams of data separately representing the content and corresponding to the respective recording devices, by using a rate changing unit, when original stream of data representing the content from the input unit is received by the rate changing unit.

18. The non transitory computer readable medium according to claim 9, wherein
the step of judging comprises judging whether the copy control information indicates the predetermined status or not by using an input unit, and
the step of outputting comprises outputting streams of data in parallel, each of the streams of data separately representing the content and corresponding to the respective recording devices, by using a rate changing unit, when original stream of data representing the content from the input unit is received by the rate changing unit.

* * * * *